(12) United States Patent
Hyoguchi et al.

(10) Patent No.: US 11,336,136 B2
(45) Date of Patent: May 17, 2022

(54) STACKED CORE AND METHOD OF MANUFACTURING STACKED CORE

(71) Applicants: Mitsui High-tec, Inc., Kitakyushu (JP); HONDA MOTOR CO., LTD., Tokyo (JP)

(72) Inventors: Akira Hyoguchi, Kitakyushu (JP); Kenta Uchida, Wako (JP)

(73) Assignees: Mitsui High-tec, Inc., Fukuoka (JP); HONDA MOTOR CO., LTD., Tokyo (JP)

( * ) Notice: Subject to any disclaimer, the term of this patent is extended or adjusted under 35 U.S.C. 154(b) by 194 days.

(21) Appl. No.: 16/718,711

(22) Filed: Dec. 18, 2019

(65) Prior Publication Data

US 2020/0204018 A1  Jun. 25, 2020

(30) Foreign Application Priority Data

Dec. 21, 2018  (JP) .............................. JP2018-239977

(51) Int. Cl.
*H02K 1/27* (2022.01)
*H02K 1/276* (2022.01)
*H02K 15/03* (2006.01)

(52) U.S. Cl.
CPC ............. *H02K 1/276* (2013.01); *H02K 15/03* (2013.01)

(58) Field of Classification Search
CPC .... H02K 15/03; H02K 15/024; H02K 15/022; H02K 1/148; H02K 1/18; H02K 1/22; H02K 1/2766; H02K 1/06; H02K 1/146; H02K 1/276; H02K 1/27; H02K 1/28
See application file for complete search history.

(56) References Cited

U.S. PATENT DOCUMENTS

| | | | | |
|---|---|---|---|---|
| 2012/0049686 | A1* | 3/2012 | Mizui | H02K 1/28 310/156.53 |
| 2017/0338724 | A1* | 11/2017 | Arakawa | H02K 1/146 |

FOREIGN PATENT DOCUMENTS

| | | |
|---|---|---|
| JP | 2000-156957 A | 6/2000 |
| JP | 2012-010497 A | 1/2012 |
| JP | 2014-233135 A | 12/2014 |
| JP | 2018-7530 A | 1/2018 |

\* cited by examiner

*Primary Examiner* — Bryan R Perez
(74) *Attorney, Agent, or Firm* — Westerman, Hattori, Daniels & Adrian, LLP

(57) ABSTRACT

A stacked core includes: a stack formed by stacking a plurality of blanked members and including a first end surface and a second end surface; a first distinguishing hole formed in the stack and being open at the first end surface; and a second distinguishing hole formed in the stack and being open at the first end surface. The spatial shape of the first distinguishing hole is different from the spatial shape of the second distinguishing hole.

6 Claims, 7 Drawing Sheets

STACKED CORE AND METHOD OF MANUFACTURING STACKED CORE

CROSS-REFERENCE TO RELATED APPLICATIONS

This application is based upon and claims the benefit of priority from Japanese Patent Application No. 2018-239977, filed on Dec. 21, 2018, the entire contents of which are incorporated herein by reference.

FIELD

The present disclosure relates to a stacked core and a method of manufacturing the stacked core.

BACKGROUND

Japanese Unexamined Patent Publication No. 2018-7530 discloses a method of manufacturing a stacked core. The method includes: blanking a plurality of core plates (blanked members) from a belt-like sheet member, a key element being formed in each core plate; and stacking the core plates to form a rotor core. Through this method, a key formed of the key elements overlapping each other protrudes from an inner peripheral surface of the rotor core.

SUMMARY

A stacked core according to one aspect of the present disclosure includes: a stack formed by stacking a plurality of blanked members and including a first end surface and a second end surface; a first distinguishing hole formed in the stack and being open at the first end surface; and a second distinguishing hole formed in the stack and being open at the first end surface. The spatial shape of the first distinguishing hole is different from the spatial shape of the second distinguishing hole.

A method of manufacturing a stacked core according to another aspect of the present disclosure includes: forming at least one first blanked member including a first hole portion and a second hole portion; forming at least one second blanked member without the first hole portion and the second hole portion; and stacking the at least one first blanked member and the at least one second blanked member to form a first stack including a first distinguishing hole formed of the first hole portion and a second distinguishing hole formed of the second hole portion on one end surface of the first stack, the spatial shape of the second distinguishing hole being different from the spatial shape of the first distinguishing hole.

A method of manufacturing a stacked core according to another aspect of the present disclosure includes: forming a first hole portion in a first row on a metal sheet; forming a second hole portion in a second row on the metal sheet, the second row being located at different position in a width direction of the metal sheet; blanking the metal sheet in the first row to form at least one first blanked member including the first hole portion; blanking the metal sheet in the first row to form at least one second blanked member without the first hole portion; blanking the metal sheet in the second row to form at least one third blanked member including the second hole portion; blanking the metal sheet in the second row to form at least one fourth blanked member without the second hole portion; stacking the at least one first blanked member and the at least one second blanked member to form a first stack including a first distinguishing hole formed of the first hole portion on one end surface of the first stack; and stacking the at least one third blanked member and the at least one fourth blanked member to form a second stack including a second distinguishing hole formed of the second hole portion on one end surface of the second stack, the spatial shape of the second distinguishing hole being different from the spatial shape of the first distinguishing hole.

DETAILED DESCRIPTION

In the following description, with reference to the drawings, the same reference numbers are assigned to the same components or to similar components having the same function, and overlapping description is omitted.

Configuration of Stacked Rotor Core

Figure 1:
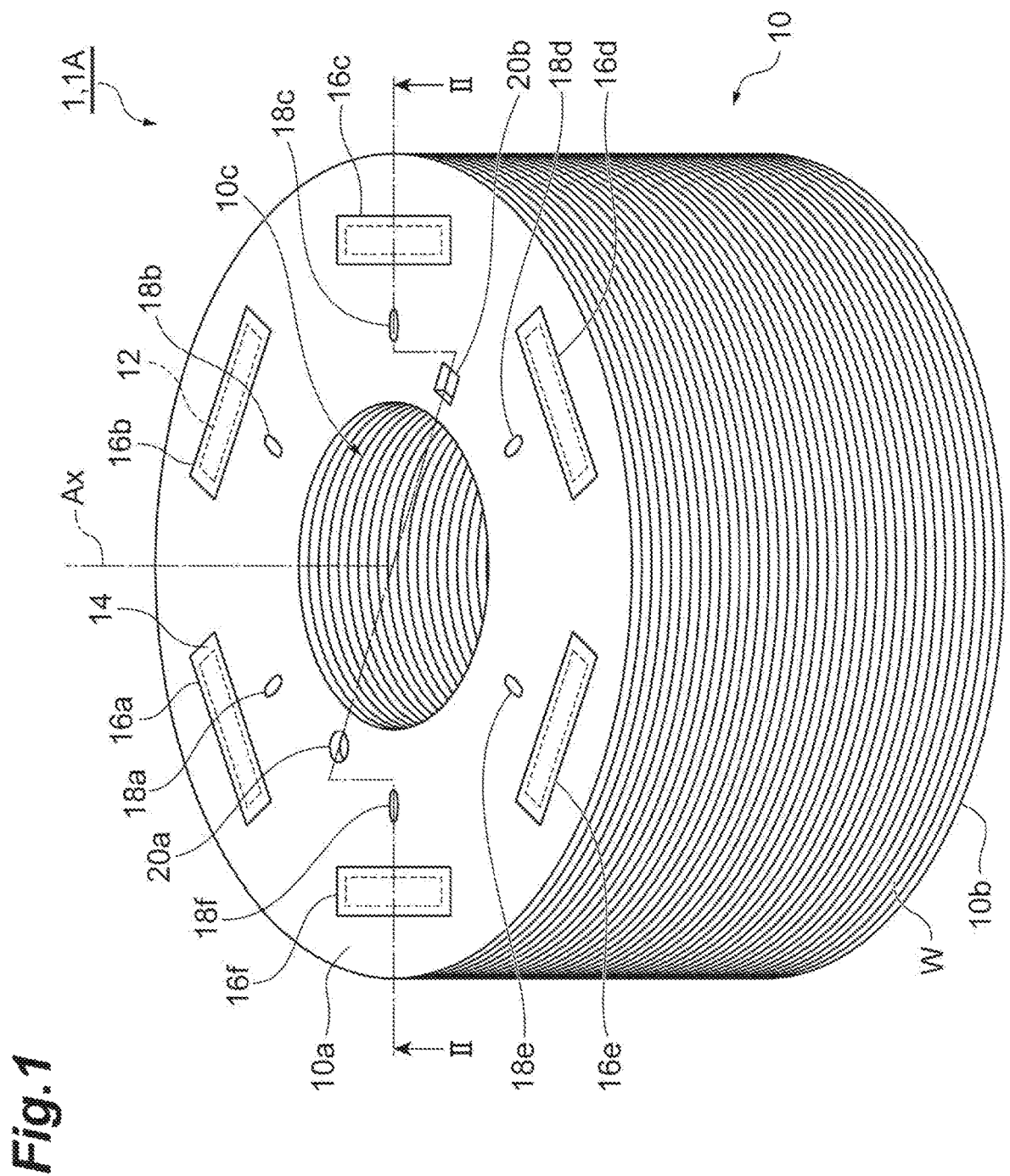
FIG. 1 is a perspective view illustrating an example stacked rotor core.
Figure 2:
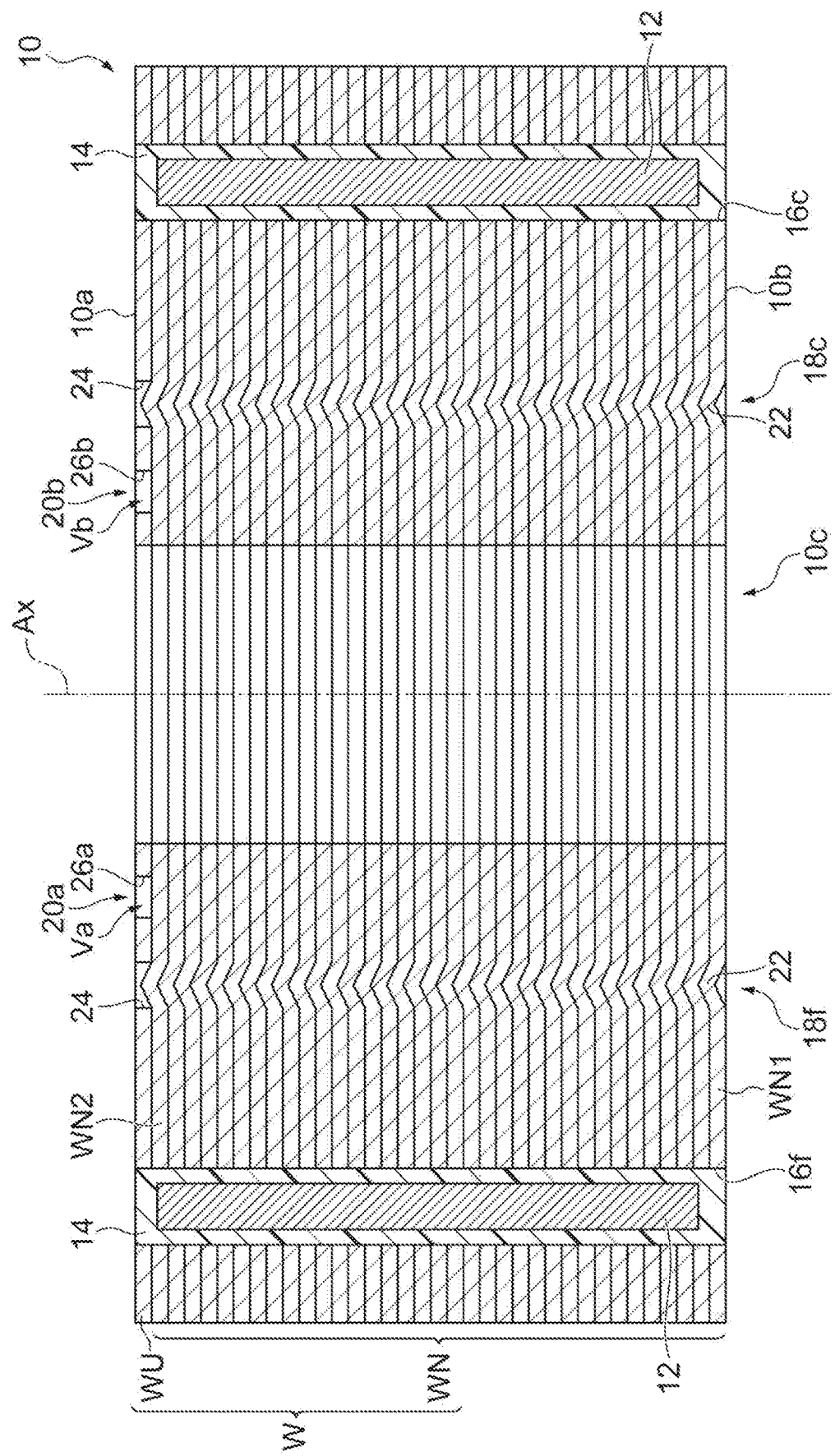
FIG. 2 is a sectional view taken along line II-II in FIG. 1.

With reference to FIG. 1 and FIG. 2, a configuration of a stacked rotor core 1 (stacked core) will be described. The stacked rotor core 1 is part of a rotor. The rotor is formed by attaching a shaft (not illustrated) to the stacked rotor core 1. A motor is formed by assembling the rotor with a stator. The stacked rotor core 1 illustrated in FIG. 1 may form part of an interior permanent magnet (IPM) motor.

As illustrated in FIG. 1, the stacked rotor core 1 includes a stack 10, a plurality of permanent magnets 12, a plurality of solidified resins 14, an distinguishing hole 20a (first distinguishing hole), and an distinguishing hole 20b (second distinguishing hole).

The stack 10 has a cylindrical shape as illustrated in FIG. 1. The stack 10 has an end surface 10a (first end surface) and an end surface 10b (second end surface). The end surfaces 10a and 10b may extend in a direction orthogonal to a central axis Ax. A shaft hole 10c penetrating the stack 10 is formed so as to extend along the central axis Ax in a central portion of the stack 10. The shaft hole 10c is open both at the end surface 10a and at the end surface 10b. The shaft hole 10c extends in a height direction (stacking direction) of the stack 10. In one example, the stack 10 is rotated about the central axis Ax, and thus the central axis Ax is also a rotation axis. A shaft is to be inserted into the shaft hole 10c. In the following description of the configuration of the stacked rotor core, the direction from the end surface 10b toward the end surface 10a is an upward direction, and the direction from the end surface 10a toward the end surface 10b is a downward direction.

In a process when a blanked member W is blanked by a punch from an electrical steel sheet ES, a burr and a droop may be formed at a circumferential portion of the shaft hole 10c. The burr is a portion of the top surface of the blanked member W, where the portion protrudes in a direction from the end surface 10b to the end surface 10a as the portion approaches from an outer circumferential edge of the blanked member W to the shaft hole 10c. The droop is a portion of the bottom surface of the blanked member W, where the portion droops in a direction from the end surface 10b to the end surface 10a as the portion approaches from the outer circumferential edge of the blanked member W to the shaft hole 10c.

A plurality of (six herein) magnet insertion holes 16a to 16f are formed in the stack 10. As illustrated in FIG. 1, the magnet insertion holes 16a to 16f are aligned along the outer periphery of the stack 10 at predetermined intervals. For example, the magnet insertion holes 16a to 16f may be arranged at angles of approximately 60° around the central axis Ax. The magnet insertion holes 16a to 16f are arranged clockwise in this order around the central axis Ax when viewed from above (when the end surface 10a is viewed in the direction from the end surface 10a toward the end surface 10b). As illustrated in FIG. 2, the magnet insertion holes 16a to 16f penetrate the stack 10 so as to extend along the central axis Ax. The magnet insertion holes 16a to 16f extend in the height direction. The magnet insertion holes 16a to 16f may be formed in the same shape. For example, the magnet insertion holes 16a to 16f may have the shape of a long hole extending along the outer periphery of the stack 10. The positions, the shapes, and the number of the magnet insertion holes 16 may be changed based on intended use and required performance, for example, of the motor.

The stack 10 is formed by stacking a plurality of blanked members W. The upper surface of a blanked member WU at the uppermost layer among the blanked members W forms the end surface 10a (upper end surface) of the stack 10. The lower surface of a blanked member WN1 at the lowermost layer among the blanked members W forms the end surface 10b (lower end surface) of the stack 10.

Each blanked member W is a plate-like member obtained by blanking an electrical steel sheet ES described later in a predetermined shape, and has a shape corresponding to the shape of the stack 10. The stack 10 may be formed by what is called rotational stack. The term "rotational stack" refers to stacking a plurality of blanked members W while relatively shifting the angle between the blanked members W. The rotational stack is performed mainly for the purpose of compensating for variations in thickness of the blanked members W. The angle of the rotational stack may be set at any angle, and may be set at 180°, for example.

Blanked members W adjacent to each other in the height direction (direction from the end surface 10a to the end surface 10b) may be fastened together by a plurality of (six herein) connecting-tab parts 18a to 18f as illustrated in FIG. 1 and FIG. 2. The connecting-tab parts 18a to 18e may be arranged so as to correspond to the magnet insertion holes 16a to 16f, respectively. The connecting-tab parts 18a to 18f may be arranged at angles of approximately 60° around the central axis Ax. The connecting-tab parts 18a to 18f may be arranged clockwise in this order around the central axis Ax when viewed from above.

As illustrated in FIG. 2, each of the connecting-tab parts 18a to 18f includes connecting tabs 22 formed in blanked members WN at layers other than the uppermost layer and a through hole 24 formed in the blanked member WU at the uppermost layer. Each connecting tab 22 has a protrusion formed on the upper surface of the blanked member WN and a groove formed on the lower surface of the blanked member WN. The groove of a connecting tab 22 of one blanked member WN is fitted to the protrusion of a connecting tab 22 of a blanked member WN adjacent to the one blanked member WN on its lower surface side. The through hole 24 is a long hole having a shape corresponding to the outer shape of the connecting tab 22. Each through hole 24 is fitted to the corresponding protrusion of a blanked member WN2 adjacent to the blanked member WU. In FIG. 2, the connecting-tab parts 18c and 18f are illustrated. The other connecting-tab parts are also formed in the same manner as the connecting-tab parts 18c and 18f.

Blanked members W may be fastened together by various known methods instead of the connecting-tab parts 18a to 18E For example, the blanked members W may be joined together with adhesive or resin material, or may be joined together by welding. Alternatively, temporarily-connecting tabs may be formed on each blanked member W, the blanked members W may be fastened together by the temporarily-connecting tabs to form a stack 10, and then the temporarily-connecting tabs may be removed from the stack. The term "temporarily-connecting tab" means a connecting tab that is used to temporarily integrating a plurality of blanked members W together and is removed in a process of manufacturing a product (stacked rotor core 1).

The distinguishing hole 20a and the distinguishing hole 20b are blind holes formed in the stack 10 (formed on the end surface 10a). The distinguishing hole 20a and the distinguishing hole 20b are open at the end surface 10a, and are not open at the end surface 10b. In the example illustrated in FIG. 2, a through hole 26a and a through hole 26b are formed in the blanked member WU, and through holes are not formed in the blanked members WN at positions corresponding to the through hole 26a and the through hole 26b. The distinguishing hole 20a is formed of a three-dimensional space Va having a depressed shape defined by the through hole 26a of the blanked member WU and an upper surface of the blanked member WN2 adjacent to the blanked member WU. The distinguishing hole 20b is formed of a three-dimensional space Vb having a depressed shape defined by the through hole 26b of the blanked member WU and an upper surface of the blanked member WN2 adjacent to the blanked member WU. The three-dimensional space Va is a space defined by an imaginary plane including the end surface 10a, the side-wall surface of the distinguishing hole 20a, and the bottom surface of the distinguishing hole 20a. The three-dimensional space Vb is a space defined by the imaginary plane including the end surface 10a, the side-wall surface of the distinguishing hole 20b, and the bottom surface of the distinguishing hole 20b.

The spatial shape of the distinguishing hole 20a is different from the spatial shape of the distinguishing hole 20b. The spatial shape of the distinguishing hole 20a refers to the shape of the three-dimensional space Va, and the spatial shape of the distinguishing hole 20b refers to the shape of the three-dimensional space Vb. In the example illustrated in FIG. 1, the spatial shape of the distinguishing hole 20a (the shape of the three-dimensional space Va) is a cylindrical shape, and the spatial shape of the distinguishing hole 20b (the shape of the three-dimensional space Vb) is a rectangular-parallelepiped shape. The shape of the distinguishing hole 20a at the end surface 10a is different from the shape of the distinguishing hole 20b at the end surface 10a. When viewed from above, the shape (contour) of the distinguishing hole 20a is different from the shape (contour) of the distinguishing hole 20b. The shape (contour) of the distinguishing hole 20a at the end surface 10a is circular, and the shape (contour) of the distinguishing hole 20b at the end surface 10a is rectangular (e.g., square). The volume of the distinguishing hole 20a (volume of the three-dimensional space Va) may be different from or may be substantially the same as the volume of the distinguishing hole 20b (volume of the three-dimensional space Vb). For example, by setting the depths of the distinguishing hole 20a and the distinguishing hole 20b (heights of the three-dimensional spaces Va and Vb) substantially the same and by setting the sizes (areas) of the distinguishing hole 20a and the distinguishing hole 20b at the end surface 10a substantially the same, the volumes of the distinguishing hole 20a and the distinguishing hole 20b may be set substantially the same. Herein, the expression "the volumes of the distinguishing hole 20a and the distinguishing hole 20b are substantially the same" includes, not only a case of being completely the same, but also a case when the volume of the distinguishing hole 20a equals the volume of the distinguishing hole 20b multiplied by 0.9 to 1.1. The sizes of the distinguishing holes 20a and 20b at the end surface 10a may be approximately 0.2 $mm^2$ to 10 $mm^2$ as one example, and the depths of the distinguishing holes 20a and 20b may be approximately 0.1 millimeter to 0.5 millimeter as one example.

The distinguishing hole 20a and the distinguishing hole 20b may be arranged with the central axis Ax interposed therebetween. The distinguishing hole 20a and the distinguishing hole 20b may be arranged along an imaginary straight line orthogonal to the central axis Ax. The distinguishing hole 20a, the central axis Ax, and the distinguishing hole 20b may be aligned in this order along the imaginary straight line. When viewed from above, the center of the distinguishing hole 20a and the center of the distinguishing hole 20b may be positioned approximately 180° apart from each other around the central axis Ax. In the example illustrated in FIG. 2, the distinguishing hole 20a and the distinguishing hole 20b are positioned inside of (closer to the central axis Ax than) the connecting-tab parts 18a to 18E When the distinguishing hole 20a and the distinguishing hole 20b are positioned closer to the shaft hole 10c, disturbance of magnetic flux which is generated from the rotor toward the stator may be less likely to occur. The straight-line distance from the central axis Ax to the distinguishing hole 20a may be substantially the same as or may be different from the straight-line distance from the central axis Ax to the distinguishing hole 20b.

The distinguishing holes 20a and 20b each have a predetermined distinguishing function, and do not have a function of joining the blanked members W together unlike the through holes 24 of the connecting-tab parts 18a to 18E Although described later in detail, the distinguishing holes 20a and 20b are holes for distinguishing by which working tool each worked portion such as a magnet insertion hole and a connecting-tab part has been formed. The distinguishing holes 20a and 20b may be holes for determining whether the stacked rotor core 1 (stack 10) stands upright or stands upside down.

Because the distinguishing holes 20a and 20b are formed on the end surface 10a and are not formed on the end surface 10b, a fact that the burr is formed on the end surface 10a may be indicated by the identification holes 20a and 20b. The burr can be formed, for example, at a circumferential portion of the shaft hole 10c, circumferential portions of the magnet insertion holes 16a to 16f, circumferential portions of the distinguishing holes 20a and 20b, and circumferential portions of the through holes 24 of the connecting-tab parts 18a to 18f Alternatively, a fact that the through holes 24 of the connecting-tab parts 18a to 18f are formed on the end surface 10a side may be indicated by the identification holes 20a and 20b. Distinguishing with using the distinguishing holes 20a and 20b may be performed by an operator, or may be performed by a device.

The permanent magnets 12 are individually inserted into the respective magnet insertion holes 16a to 16f as illustrated in FIG. 1 and FIG. 2. Each permanent magnet 12 may be a rectangular parallelepiped shape. The type of the permanent magnet 12 may be determined based on, for example, intended use and required performance of the motor, and may be a sintered magnet or a bond magnet, for example.

The solidified resins 14 are resins formed by charging resin material in a melted state (melted resin) into the magnet insertion holes 16a to 16f in which the permanent magnets 12 have been inserted and then solidifying the melted resin. The solidified resins 14 may be configured to fix the permanent magnets 12 in the magnet insertion holes 16a to 16f, and to join together blanked members W adjacent to each other in the height direction. Examples of resin material forming each solidified resin 14 include a thermosetting resin and a thermoplastic resin. Examples of the thermosetting resin include resin compositions containing an epoxy resin, a curing initiator, and an additive. Examples of the additive include a filler, a flame retardant, and a stress-lowering agent.

Device for Manufacturing Stacked Rotor Core

Figure 3:
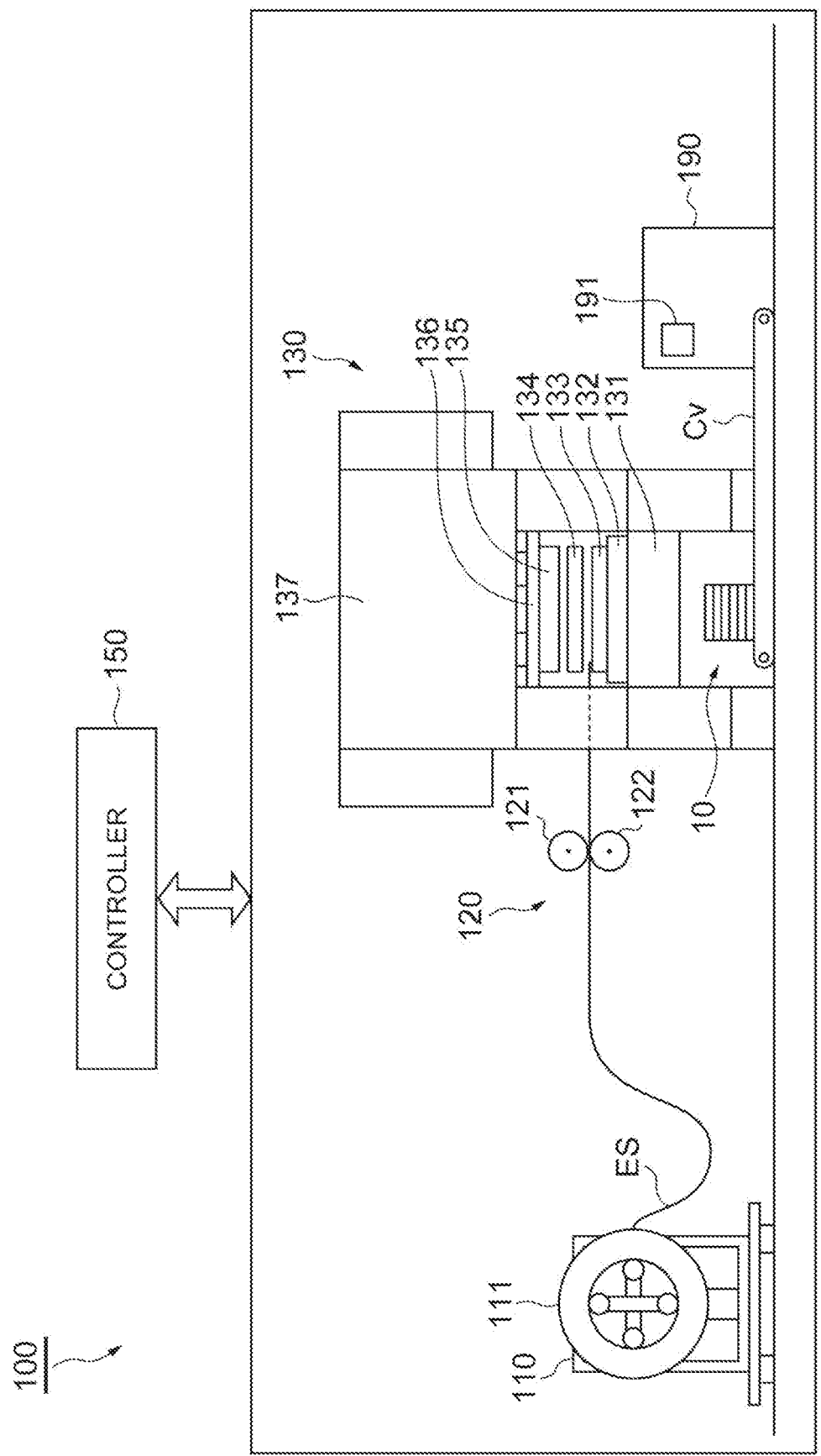
FIG. 3 is a schematic diagram illustrating an example device for manufacturing a stacked rotor core.
Figure 4:
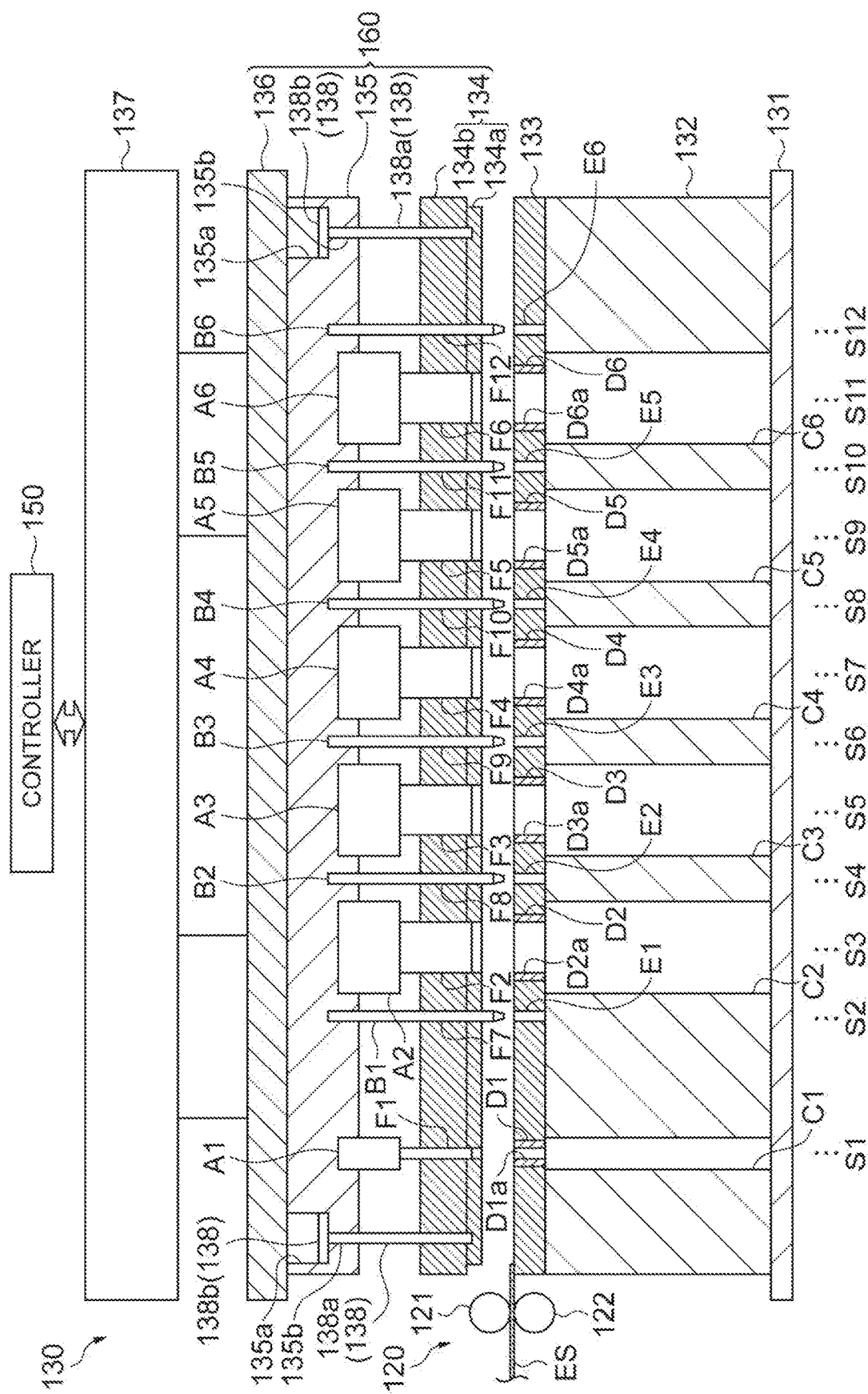
FIG. 4 is a schematic diagram illustrating an example blanking device.
Figure 5:
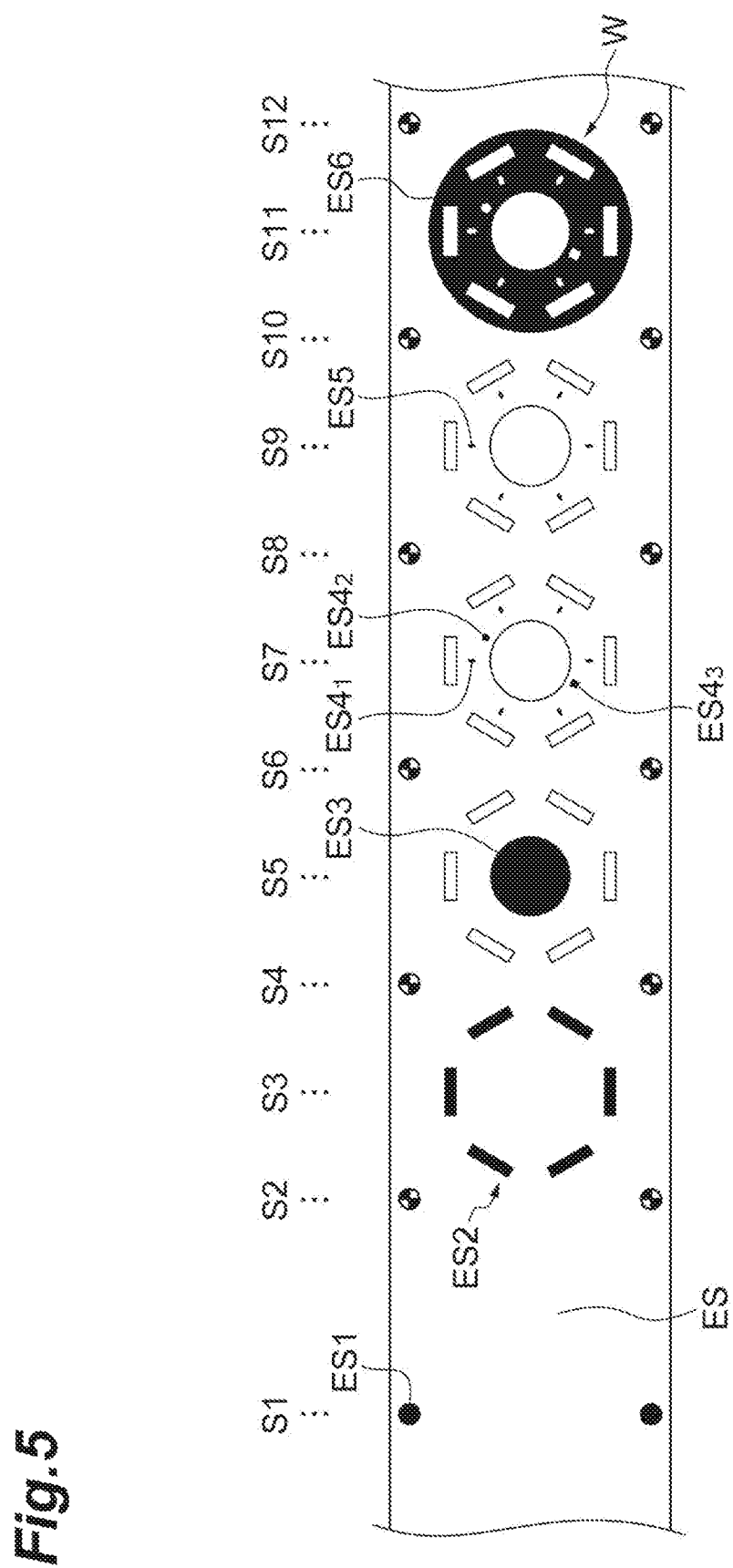
FIG. 5 is a diagram illustrating an example layout of stamping.

The following describes a device 100 for manufacturing the stacked rotor core 1 with reference to FIG. 3 to FIG. 5. The device 100 is configured to manufacture the stacked rotor core 1 from an electrical steel sheet ES (metal sheet) that is a belt-like workpiece sheet. The device 100 includes an uncoiler 110, a feeder 120, a blanking device 130, an inspection device 190, and a controller 150 (control unit).

The uncoiler 110 rotatably supports a coiled material 111 that is a belt-like electrical steel sheet ES wound in a coiled shape, with the coiled material 111 being mounted thereon. The feeder 120 has a pair of rollers 121 and 122 configured to sandwich the electrical steel sheet ES from above and below. The pair of rollers 121 and 122 rotates and stops rotating in response to instruction signals from the controller 150, thereby sequentially feeding the electrical steel sheet ES toward the blanking device 130 on an intermittent basis.

The blanking device 130 is configured to sequentially blank the electrical steel sheet ES that is fed by the feeder 120 on an intermittent basis to form blanked members W (blanked members WU and WN), and to sequentially stack blanked members W obtained by the blanking to form a stack 10. Details of the blanking device 130 will be described later.

The inspection device 190 is configured to check whether the stack 10 stands upright or stands upside down. For example, the inspection device 190 may determine that the stack 10 stands upside down when the end surface 10a is positioned on the upper side. The inspection device 190 may determine that the stack 10 stands upright when the end surface 10a is positioned on the lower side. The inspection device 190 may include a laser device 191. The laser device 191 is configured to emit a laser beam from above toward a stack 10 conveyed from the blanking device 130 by a conveyor Cv and receive reflected light of the laser beam. For example, the laser device 191 may emit a laser beam toward positions where the distinguishing holes 20a and 20b are formed. The laser device 191 may emit a laser beam toward the end surface 10b of the stack 10. The laser device 191 emits a laser beam on the basis of an instruction signal from the controller 150 and outputs a signal based on received reflected light to the controller 150.

The controller 150 generates an instruction signal for operating each of the feeder 120, the blanking device 130, and the inspection device 190 based on a program stored in a recording medium (not illustrated) or an operation input from an operator, for example. The controller 150 transmits the instruction signal thus generated to the corresponding one of the feeder 120, the blanking device 130, and the inspection device 190.

Example Configuration of Blanking Device

As illustrated in FIG. 3 and FIG. 4, the blanking device 130 includes a base 131, a lower die 132, a die plate 133, a stripper 134, an upper die 135, a top plate 136, a press machine 137 (drive unit), hangers 138, punches A1 to A6, and positioning pins B1 to B6. For example, the punch A2 includes a plurality of cutting edges (working tools) each corresponding to the magnet insertion holes 16a to 16E The punch A3 includes a cutting edge corresponding to the shaft hole 10c. The punch A4 includes a plurality of cutting edges (working tools) each corresponding to the through holes 24 of the connecting-tab parts 18a to 18f and cutting edges each corresponding to the distinguishing hole 20a and the distinguishing hole 20b. The punch A5 includes a plurality of cutting edges (working tools) each corresponding to the connecting tabs 22 of the connecting-tab parts 18a to 18E The punch A6 includes a cutting edge corresponding to the outer periphery of the blanked member W. The base 131 supports the lower die 132 placed on the base 131.

The lower die 132 supports the die plate 133 placed on the lower die 132. The lower die 132 respectively has, at positions corresponding to the punches A1 to A6, discharge holes C1 to C6 through which materials (e.g., blanked members W, materials to be discarded) that have been blanked from the electrical steel sheet ES are discharged. For example, a stage (not illustrated) configured to be vertically movable is provided in the discharge hole C6, and a plurality of blanked members W are stacked on the stage while the stage is being lowered. When a predetermined number of blanked members W have been stacked, the stack 10 is pushed out from the blanking device 130.

The die plate 133 is configured to form a blanked member W in conjunction with the punches A1 to A6. The die plate 133 includes dies D1 to D6 at positions corresponding to the punches A1 to A6, respectively. The dies D1 to D6 respectively have through holes D1a to D6a (die holes) extending in the vertical direction. The through holes D1a to D6a are continuous with the corresponding discharge holes C1 to C6, respectively. The through holes D1a to D6a have diameters through which distal-end portions of the corresponding punches A1 to A6 can be inserted and that are slightly larger than the distal-end portions, respectively. The die plate 133 has insertion holes E1 to E6 at positions corresponding to the positioning pins B1 to B6, respectively.

The stripper 134 includes a stripper plate 134a and a holding plate 134b. The stripper plate 134a is configured to remove the electrical steel sheet ES sticking to the punches A1 to A6 from the punches A1 to A6 when the electrical steel sheet ES is blanked with the punches A1 to A6. The stripper plate 134a is positioned above the die plate 133. The holding plate 134b holds the stripper plate 134a from above.

The stripper 134 has through holes F1 to F6 at positions corresponding to the punches A1 to A6, respectively. The through holes F1 to F6 extend in the vertical direction and are continuous with the through holes D1a to D6a of the corresponding dies D1 to D6, respectively. Lower portions of the punches A1 to A6 are inserted into the through holes F1 to F6, respectively. The lower portions of the punches A1 to A6 are slidable in the through holes F1 to F6, respectively.

The stripper 134 has through holes F7 to F12 at positions corresponding to the positioning pins B1 to B6, respectively. The through holes F7 to F12 extend in the vertical direction and are continuous with the corresponding insertion holes E1 to E6, respectively. Lower portions of the positioning pins B1 to B6 are inserted into the through holes F7 to F12, respectively. The lower portions of the positioning pins B1 to B6 are slidable in the through holes F7 to F12, respectively.

The upper die 135 is positioned above the stripper 134. Base portions (upper portions) of the punches A1 to A6 and the positioning pins B1 to B6 are fixed to the upper die 135. Thus, the upper die 135 holds the punches A1 to A6 and the positioning pins B1 to B6. An accommodation space 135a positioned on the top plate 136 side and extending in the vertical direction, and a through hole 135b penetrating downward from the accommodation space 135a are formed in each of end portions of the upper die 135 on the upstream side and the downstream side of the blanking device 130.

The top plate 136 is positioned above the upper die 135. The top plate 136 holds the upper die 135. The press machine 137 is positioned above the top plate 136. A piston of the press machine 137 is connected to the top plate 136, and operates in response to instruction signals from the controller 150. When the press machine 137 operates, the piston elongates and contracts, thereby moving the stripper 134, the upper die 135, the top plate 136, the hangers 138, the punches A1 to A6, and the positioning pins B1 to B6 (hereinafter, these are called "movable part 160") up and down.

The hangers 138 hang the stripper 134 on the upper die 135 to hold the stripper 134. Each hanger 138 includes a long rod portion 138a and a head 138b formed on the upper end of the rod portion 138a. A lower end portion of the rod portion 138a is fixed to the stripper 134. An upper end portion of the rod portion 138a is inserted into the corresponding through hole 135b of the upper die 135. The head 138b has a diameter larger than that of the lower end portion, and is accommodated in the corresponding accommodation space 135a in the upper die 135. Thus, the head 138b is vertically movable in the accommodation space 135a with respect to the upper die 135.

The positioning pins B1 to B6 are configured to position the electrical steel sheet ES when the electrical steel sheet ES is blanked by the punches A1 to A6. The respective positioning pins B1 to B6 are arranged so as to be aligned in this order from the upstream side (feeder 120 side) of the blanking device 130 toward the downstream side.

Method of Manufacturing Stacked Rotor Core

The following describes a method of manufacturing a stacked rotor core 1 with reference to FIG. 3 to FIG. 5. To begin with, the electrical steel sheet ES is fed by the feeder 120 to the blanking device 130, and when a portion to be worked of the electrical steel sheet ES has reached the punch A1, the controller 150 issues instructions to the press machine 137, and the press machine 137 accordingly pushes down the movable part 160 toward the die plate 133. Even after the stripper 134 has reached the die plate 133 and the electrical steel sheet ES has been sandwiched between the stripper 134 and the die plate 133, the controller 150 issues instructions to the press machine 137, and the press machine 137 accordingly pushes the movable part 160 downward.

At this time, although the stripper 134 does not move, distal-end portions of the punches A1 to A6 and the positioning pins B1 to B6 move through the through holes F1 to F12 of the stripper plate 134a to reach the corresponding through holes D1a to D6a and the corresponding insertion holes E1 to E6 in the die plate 133. Consequently, the electrical steel sheet ES is blanked by the punch A1 in a predetermined blanking shape, whereby a pair of through holes ES1 is formed near both edges of the electrical steel sheet ES (see the position S1 in FIG. 5). Materials to be discarded that have been blanked are discharged from the discharge hole C1 of the lower die 132. Subsequently, the press machine 137 operates to raise the movable part 160.

Subsequently, the electrical steel sheet ES is fed by the feeder 120. When the portion to be worked of the electrical steel sheet ES has reached the punch A2, the controller 150 issues instructions to the press machine 137, and the press machine 137 accordingly lowers and raises the movable part 160. Consequently, the electrical steel sheet ES is blanked by the punch A2 in a predetermined blanking shape, whereby blanked portions ES2 are formed in the electrical steel sheet ES (see the position S3 in FIG. 5).

The blanked portions ES2 are worked portions including six through holes that are aligned in a circular shape. These six through holes constituting the blanked portions ES2 are formed (worked) with the cutting edges included in the punch A2 respectively. The six through holes each correspond to the magnet insertion holes 16a to 16E Materials to be discarded that have been blanked are discharged from the discharge hole C2 of the lower die 132. When the electrical steel sheet ES is blanked by the punch A2, the positioning pins B1 and B2 are inserted into the through holes ES1 and the insertion holes E1 and E2 (see the positions S2 and S4 in FIG. 5).

Subsequently, the electrical steel sheet ES is fed by the feeder 120. When the portion to be worked of the electrical steel sheet ES has reached the punch A3, the controller 150 issues instructions to the press machine 137, and the press machine 137 accordingly lowers and raises the movable part 160. Consequently, the electrical steel sheet ES is blanked by the punch A3 in a predetermined blanking shape, whereby a blanked portion ES3 is formed in the electrical steel sheet ES (see the position S5 in FIG. 5).

The blanked portion ES3 is a worked portion formed of a circular through hole. This through hole corresponds to the shaft hole 10c. Materials to be discarded that have been blanked are discharged from the discharge hole C3 of the lower die 132. When the electrical steel sheet ES is blanked by the punch A3, the positioning pins B2 and B3 are inserted into the through holes ES1 and the insertion holes E2 and E3 (see the positions S4 and S6 in FIG. 5).

Subsequently, the electrical steel sheet ES is fed by the feeder 120. When the portion to be worked of the electrical steel sheet ES has reached the punch A4, the controller 150 issues instructions to the press machine 137, and the press machine 137 accordingly lowers and raises the movable part 160. Consequently, the electrical steel sheet ES is blanked by the punch A4 in a predetermined blanking shape, whereby blanked portions $ES4_1$, blanked portion $ES4_2$, and blanked portion $ES4_3$ are formed in the electrical steel sheet ES (see the position S7 in FIG. 5).

The blanked portions $ES4_1$ are worked portions including six through holes that are aligned in a circular shape. These six through holes constituting the blanked portions $ES4_1$ are formed (worked) with the cutting edges included in the punch A4 respectively. The six through holes correspond to the through holes 24 of the connecting-tab parts 18a to 18f, respectively. The blanked portion $ES4_2$ (first hole portion) and the blanked portion $ES4_3$ (second hole portion) are two through holes that are positioned approximately 180° apart from each other around the center of the blanked portion ES3. The blanked portion $ES4_2$ corresponds to the distinguishing hole 20a (the through hole 26a of the blanked member WU), and the blanked portion $ES4_3$ corresponds to the distinguishing hole 20b (the through hole 26b of the blanked member WU). Materials to be discarded that have been blanked are discharged from the discharge hole C4 of the lower die 132. When the electrical steel sheet ES is blanked by the punch A4, the positioning pins B3 and B4 are inserted into the through holes ES1 and the insertion holes E3 and E4 (see the positions S6 and S8 in FIG. 5). This blanking of the electrical steel sheet ES by the punch A4 is not performed when the connecting tabs 22 of the connecting-tab parts 18a to 18f are formed (this case will be described later).

Subsequently, the electrical steel sheet ES is fed by the feeder 120. When the portion to be worked of the electrical steel sheet ES has reached the punch A5, the controller 150 issues instructions to the press machine 137, and the press machine 137 accordingly lowers and raises the movable part 160. Consequently, the electrical steel sheet ES is half-blanked by the punch A5 in a predetermined blanking shape, whereby worked portions ES5 are formed in the electrical steel sheet ES (see the position S9 in FIG. 5).

The worked portions ES5 includes six projecting and depressed portions that are aligned in a circular shape. These six projecting and depressed portions constituting the worked portions ES5 are formed (worked) with the cutting edges included in the punch A5 respectively. The six projecting and depressed portions each correspond to the connecting tabs 22 of the connecting-tab parts 18a to 18E When the electrical steel sheet ES is half-blanked by the punch A5, the positioning pins B4 and B5 are inserted into the through holes ES1 and the insertion holes E4 and E5 (see the positions S8 and S10 in FIG. 5). This mechanical working of the electrical steel sheet ES by the punch A5 is not performed when the distinguishing holes 20a and 20b and the through holes 24 of the connecting-tab parts 18a to 18f are formed.

Subsequently, the electrical steel sheet ES is fed by the feeder 120. When the portion to be worked of the electrical steel sheet ES has reached the punch A6, the controller 150 issues instructions to the press machine 137, and the press machine 137 accordingly lowers and raises the movable part 160. Consequently, the electrical steel sheet ES is blanked by the punch A6 in a predetermined blanking shape, whereby a blanked portion ES6 is formed (see the position S11 in FIG. 5).

The blanked portion ES6 corresponds to each blanked member W. The blanked portion ES6 corresponding to either one of the blanked member WU (first blanked member) and the blanked member WN (second blanked member) included in the blanked members W. In FIG. 5, a case when the blanked portion ES6 corresponds to the blanked member WU is illustrated, and illustration of a case when the blanked portion ES6 corresponds to the blanked member WN is omitted. When the blanked portion ES6 corresponds to the blanked member WU, the outer periphery of the blanked portion ES6 surrounds the blanked portions ES2, the blanked portion ES3, the blanked portions ES4i, and the blanked portions $ES4_2$ and $ES4_3$. In this case, a blanked member WU including the blanked portions ES2, ES3, and $ES4_1$ to $ES4_3$ is formed. When the blanked portion ES6 corresponds to the blanked member WN, the outer periphery of the blanked portion ES6 surrounds the blanked portions ES2 and ES3 and the worked portions ES5. In this case, a blanked member WN including the blanked portions ES2 and ES3 and the worked portions ES5 but without the blanked portions $ES4_2$ and $ES4_3$ is formed. When the electrical steel sheet ES is blanked by the punch A6, the positioning pins B5 and B6 are inserted into the through holes ES1 and the insertion holes E5 and E6 (see the positions S10 and S12 in FIG. 5).

Subsequently, the blanked member W is placed on the stage in the discharge hole C6, and is stacked while being fastened with a blanked member W that has been blanked next. For example, a blanked member WU is placed on the stage first, and then a plurality of blanked members WN are sequentially stacked thereon, whereby a stack 10 (first stack) is formed. When a subsequent blanked member WN is stacked on the blanked member WU, an distinguishing hole 20a is formed of the blanked portion $ES4_2$ and a surface of the blanked member WN, and an distinguishing hole 20b is formed of the blanked portion $ES4_3$ and a surface of the blanked member WN. The stack 10 is then pushed out from the blanking device 130, and the stack 10 is conveyed by the conveyor Cv. Subsequently, inspection of the stack 10 (e.g., check of orientation of the end surface of the stack 10) using the distinguishing holes 20a and 20b may be performed by the inspection device 190, or insertion of permanent magnets 12 and charging of solidified resins 14 may be performed. Before the step of inserting the permanent magnets 12, the orientation of the end surface of the stack 10 may be checked by the inspection device 190. For example, by emitting a laser beam toward the stack 10, whether the stack 10 stands upright may be checked before the insertion of the magnets. In this check, it may be determined that the stack 10 stands upright when the distinguishing hole 20a or the distinguishing hole 20b has not been detected with the laser beam. Through the above-described steps, a stacked rotor core 1 is formed.

In some examples, the spatial shape of the distinguishing hole 20a is different from the spatial shape of the distinguishing hole 20b. Because the shape of the stacked rotor core 1 is not rotationally symmetric about the central axis Ax, the position of a worked portion with respect to the distinguishing hole 20a (distinguishing hole 20b) is uniquely determined. For example, the angle of each of the worked portions about the central axis Ax when the angle of the distinguishing hole 20a with respect to the central axis Ax is defined as 0° is uniquely determined. The positions of the magnet insertion holes 16a to 16f and the connecting-tab parts 18a to 18f (angles about the central axis Ax from the distinguishing hole 20a) are uniquely determined. Thus, correspondence relation between each worked portion (e.g., magnet insertion holes, connecting-tab parts) included in a blanked member W and the corresponding working tool (e.g., cutting edges included in the punches A2 and A4) can be figured out. By which working tool each of the worked portions has been worked can be distinguished.

By obtaining the correspondence relation between the worked portion and the working tool, for example, the working tool can be adjusted based on conditions of the worked portion that have been checked after the stack 10 (stacked rotor core 1) is formed. When a problem occurs in conditions of a worked portion in the formed stack 10, a working tool corresponding thereto can be easily distinguished. In the stacked rotor core 1, a working tool corresponding to each worked portion can be distinguished by utilizing the distinguishing holes used for another intended use (e.g. for distinguishing posture of the stack 10) without drawing marking lines on an electrical steel sheet.

In some examples, both the through hole 26a and the through hole 26b penetrate the blanked member WU forming the end surface 10a among a plurality of blanked members W. As in this configuration, the distinguishing hole 20a and the distinguishing hole 20b are formed by forming the through hole 26a and the through hole 26b in at least the blanked member WU among the blanked members W, and thus the distinguishing hole 20a and the distinguishing hole 20b can be easily formed.

In some examples, the distinguishing hole 20a and the distinguishing hole 20b have different shapes in the end surface 10a. In this case, because the spatial shape of the distinguishing hole 20a and the spatial shape of the distinguishing hole 20b are different, by which working tool each worked portion has been worked can be distinguished.

In some examples, the distinguishing hole 20a and the distinguishing hole 20b are arranged with central axis Ax of the stack 10 interposed therebetween. In this case, because the distinguishing hole 20a and the distinguishing hole 20b are aligned in a straight line, the weight of an area removed from the stack 10 due to the presence of the distinguishing hole 20a and the weight of an area removed from the stack 10 due to the presence of the distinguishing hole 20b can be balanced. Thus, lack of weight balance (weight imbalance) is less likely to occur in the stacked rotor core 1. Consequently, abnormal vibrations, noises, and the like during rotation of the stacked rotor core 1 can be reduced.

In some examples, the volume of the distinguishing hole 20a is substantially same as the volume of the distinguishing hole 20b. Thus, weight imbalance of the stacked rotor core 1 is still less likely to occur. Consequently, abnormal vibrations, noises, and the like during rotation of the stacked rotor core 1 can be further reduced.

There are occasions when a blanked member W is removed from a stack 10 on the end surface 10b side in order to adjust the thickness of the stack 10. In some examples, the distinguishing hole 20a and the distinguishing hole 20b are formed on the end surface 10a of the stack 10, the end surface 10a including the through holes 24 of the connecting-tab parts 18a to 18E Thus, the thickness of the stack 10 can be adjusted with the distinguishing holes 20a and 20b being left remaining in the stack 10.

It is to be understood that not all aspects, advantages and features described herein may necessarily be achieved by, or included in, any one particular example embodiment. Indeed, having described and illustrated various examples herein, it should be apparent that other examples may be modified in arrangement and detail may be omitted.

Figure 6:
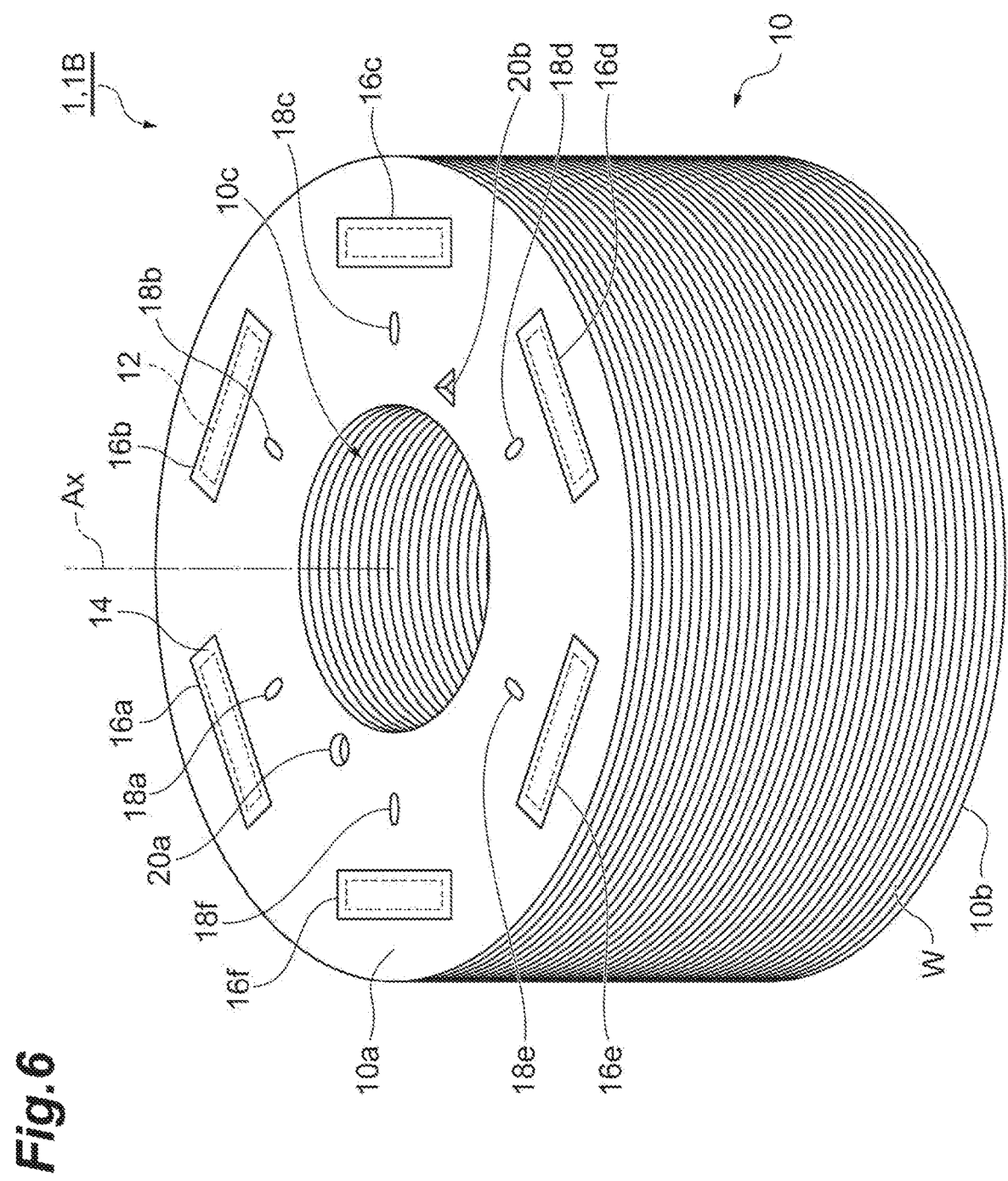
FIG. 6 is a perspective view illustrating another example stacked rotor core.

In some examples, the spatial shapes of the distinguishing holes 20a and 20b are not limited to particular ones and may be set to any shapes if these spatial shapes are different. When viewed from above, the shapes of the distinguishing holes 20a and 20b may be different. For example, as illustrated in FIG. 6, when viewed from above, the shape (contour) of the distinguishing hole 20a may be circular, and the shape (contour) of the distinguishing hole 20b may be triangular. The spatial shape of the distinguishing hole 20a may be a cylindrical shape, and the spatial shape of the distinguishing hole 20b may be a triangular prism shape.

Although not illustrated, the size of the distinguishing hole 20a at the end surface 10a may be different from the size of the distinguishing hole 20b at the end surface 10a. When the sizes of the distinguishing holes 20a and 20b at the end surface 10a are different, the spatial shapes of the distinguishing hole 20a and the distinguishing hole 20b are different, and thus by which working tool each worked portion has been worked can be distinguished. In this case, the shapes of the distinguishing hole 20a and the distinguishing hole 20b at the end surface 10a may be similar to each other, or may be different. The depths of the distinguishing hole 20a and the distinguishing hole 20b may be substantially the same, or may be different.

Although not illustrated, the depth of the distinguishing hole 20a may be different from the depth of the distinguishing hole 20b. When the depths of the distinguishing holes 20a and 20b are different, the spatial shapes of the distinguishing hole 20a and the distinguishing hole 20b are different, and thus by which working tool each worked portion has been worked can be distinguished. In this case, the shapes of the distinguishing holes 20a and 20b at the end surface 10a may be similar to each other, or may be different. The sizes of the distinguishing holes 20a and 20b at the end surface 10a may be substantially the same, or may be different.

In some examples, the volume of the distinguishing hole 20a and the distinguishing hole 20b may be different. The distinguishing hole 20a and the distinguishing hole 20b may be arranged at angles smaller than 180° apart from each other around the central axis Ax. The stacked rotor core 1 may have three or more distinguishing holes at intervals substantially evenly spaced apart from each other around the central axis Ax. In this case, the three or more distinguishing holes may have a combination of spatial shapes such that the stacked rotor core 1 is not rotationally symmetric about the central axis Ax.

In some examples, the distinguishing hole 20a and the distinguishing hole 20b may be formed so as to be open at the end surface 10b instead of being open at the end surface 10a.

In some examples, the distinguishing holes 20a and 20b may be formed in the stack 10 by forming blind holes, which does not penetrate, in the blanked member WU instead of the through holes 26a and 26b. The worked portion (hole portion) corresponding to the distinguishing hole 20a or 20b may include the blind hole or the through hole. The distinguishing hole 20a may be formed of through holes (hole portions) which are formed in each of two or more blanked members W and continuously extends in a row in the height direction. The distinguishing holes 20b may be formed of through holes (hole portions) which are formed in each of the two or more blanked members W and continuously extends in a row in the height direction. The two or more blanked members W may include the blanked member WU at the uppermost layer but may not include the blanked member WN1 at the lowermost layer.

In some examples, the stacked rotor core 1 illustrated in FIG. 1 including the circular distinguishing hole 20a and the rectangular distinguishing hole 20b may be manufactured by one blanking device 130 at almost the same time as the stacked rotor core 1 illustrated in FIG. 6 including the circular distinguishing hole 20a and the triangular distinguishing hole 20b. Hereinafter, the stacked rotor core 1 in FIG. 1 is called "stacked rotor core 1A", and the stacked rotor core 1 in FIG. 6 is called "stacked rotor core 1B".

Figure 7:
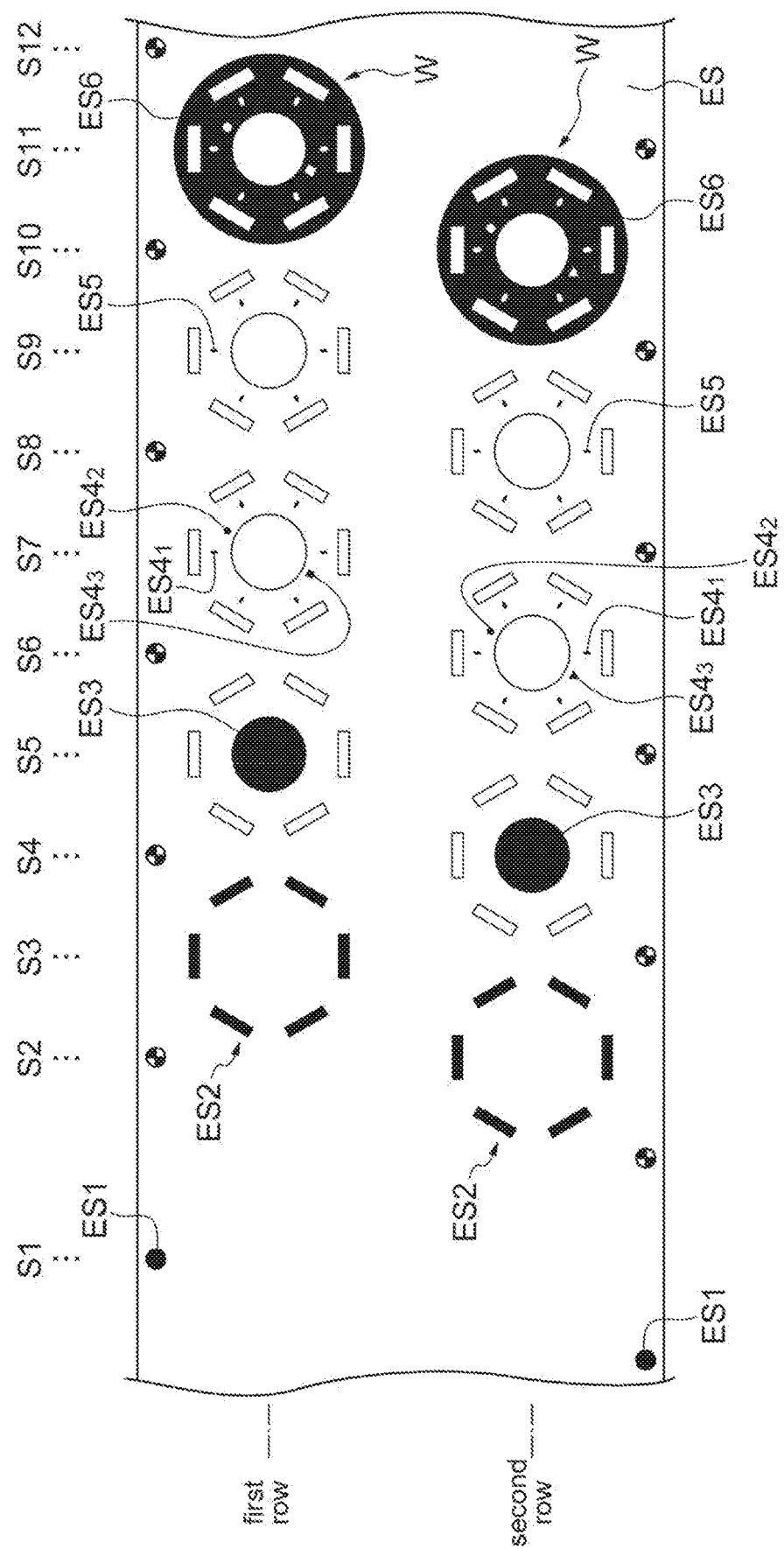
FIG. 7 is a diagram illustrating another example layout of stamping.

As illustrated in FIG. 7, the blanking device 130 may blank, in the respective rows which are located at positions different from each other in a width direction of the electrical steel sheet ES, a plurality of blanked members W forming a stack 10 (first stack) of the stacked rotor core 1A and a plurality of blanked members W forming a stack 10 (second stack) of the stacked rotor core 1B from the electrical steel sheet ES. The blanking device 130 may perform what is called taking out two rows. The width direction of the electrical steel sheet ES (simply called "width direction") is orthogonal to the feeding direction of the electrical steel sheet ES. Hereinafter, the row positioned on the upper side in the page of FIG. 7 is called "first row", and the row positioned on the lower side therein is called "second row".

In the example illustrated in FIG. 7, the blanking device 130 includes two punches A1 aligned in the width direction and two dies D1 corresponding to the respective punches A1. In the same manner, the blanking device 130 includes two punches A2, two punches A3, two punches A4, two punches A5, and two punches A6. The blanking device 130 includes two dies D2, two dies D3, two dies D4, two dies D5, and two dies D6. The distal-end shapes of the two punches A1 are substantially the same, the distal-end shapes of the two punches A2 are substantially the same, the distal-end shapes of the two punches A3 are substantially the same, the distal-end shapes of the two punches A5 are substantially the same, and the distal-end shapes of the two punches A6 are substantially the same. However, the distal-end shape of the punch A4 for working the first row is partially different from the distal-end shape of the punch A4 for working the second row.

With reference to FIG. 3, FIG. 4, and FIG. 7, a method of manufacturing stacked rotor cores 1A and 1B when stacks 10 of the stacked rotor cores 1A and 1B are manufactured at almost the same time by one blanking device 130 will be described below. To begin with, when the movable part 160 has been lowered and raised, the electrical steel sheet ES is blanked by the two punches A2 aligned in the width direction in a predetermined blanking shape, whereby two set of blanked portions ES2 are formed in the electrical steel sheet ES (see the position S3 in FIG. 7). One of the two set of the blanked portions ES2 is formed in the first row, and corresponds to the magnet insertion holes 16a to 16f in the stacked rotor core 1A. The other of the two set of the blanked portions ES2 is formed in the second row, and corresponds to the magnet insertion holes 16a to 16f in the stacked rotor core 1B.

Subsequently, the electrical steel sheet ES is fed by the feeder 120. When the movable part 160 has been lowered and raised, the electrical steel sheet ES is blanked by the two punches A3 aligned in the width direction in a predetermined blanking shape, whereby two blanked portions ES3 are formed in the electrical steel sheet ES (see the position S5 in FIG. 7). One of the two blanked portions ES3 is formed in the first row, and corresponds to the shaft hole 10c in the stacked rotor core 1A. The other of the two blanked portions ES3 is formed in the second row, and corresponds to the shaft hole 10c in the stacked rotor core 1B.

Subsequently, the electrical steel sheet ES is fed by the feeder 120. When the movable part 160 has been lowered and raised, the electrical steel sheet ES is blanked by the two punches A4 aligned in the width direction in a predetermined blanking shape, whereby two set of blanked portions $ES4_1$, two blanked portions $ES4_2$, and two blanked portions $ES4_3$ are formed in the electrical steel sheet ES (see the position S7 in FIG. 7). One of the two set of blanked portions $ES4_1$ is formed in the first row, and corresponds to the through holes 24 of the connecting-tab parts in the stacked rotor core 1A. The other of the two set of blanked portions $ES4_1$ is formed in the second row, and corresponds to the through holes 24 of the connecting-tab parts in the stacked rotor core 1B.

One blanked portion (first hole portion) of the two blanked portions $ES4_2$ is formed in the first row, and corresponds to the distinguishing hole 20a (first distinguishing hole) of the stacked rotor core 1A. The other blanked portion (third hole portion) of the two blanked portions $ES4_2$ is formed in the second row, and corresponds to the distinguishing hole 20a (third distinguishing hole) of the stacked rotor core 1B. One blanked portion (second hole portion) of the two blanked portions $ES4_3$ is formed in the first row, and corresponds to the distinguishing hole 20b (second distinguishing hole) of the stacked rotor core 1A. The other blanked portion (fourth hole portion) of the two blanked portions ES4₃ corresponds to the distinguishing hole 20b (fourth distinguishing hole) of the stacked rotor core 1B. In the example illustrated in FIG. 7, the blanked portion ES4₃ corresponding to the distinguishing hole 20b in the stacked rotor core 1A has a rectangular shape, and the blanked portion ES4₃ corresponding to the distinguishing hole 20b in the stacked rotor core 1B has a triangular shape.

When the electrical steel sheet ES is not worked by the punch A4, the electrical steel sheet ES is half-blanked in a predetermined blanking shape by the two punches A5 aligned in the width direction, whereby two set of worked portions ES5 are formed in the electrical steel sheet ES (see the position S9 in FIG. 7). One of the two set of the worked portions ES5 is formed in the first row, and corresponds to the connecting tabs 22 of the connecting-tab parts in the stacked rotor core 1A. The other of the two set of the worked portions ES5 is formed in the second row, and corresponds to the connecting tabs 22 of the connecting-tab parts in the stacked rotor core 1B.

Subsequently, the electrical steel sheet ES is fed by the feeder 120. When the movable part 160 has been lowered and raised, the electrical steel sheet ES is blanked by the two punches A6 in a predetermined blanking shape, whereby two blanked portions ES6 are formed (see the position S11 in FIG. 7). One of the two blanked portions ES6 is formed in the first row, and corresponds to a blanked member W in the stacked rotor core 1A. The blanked portion ES6 formed in the first row corresponds to either one of the blanked member WU (first blanked member) and each blanked member WN (second blanked member) included in the blanked members W of the stacked rotor core 1A. The other of the two blanked portions ES6 is formed in the second row, and corresponds to a blanked member W of the stacked rotor core 1B. The blanked portion ES6 formed in the second row corresponds to either one of the blanked member WU (third blanked member) and each blanked member WN (fourth blanked member) included in the blanked members W of the stacked rotor core 1B.

By stacking the blanked member WU and the blanked members WN of the stacked rotor core 1A in one discharge hole C6, the distinguishing hole 20a in the stacked rotor core 1A is formed of the blanked portion ES4₂ in the first row, and the distinguishing hole 20b in the stacked rotor core 1A is formed of the blanked portion ES4₃ in the first row. By stacking the blanked member WU and the blanked members WN of the stacked rotor core 1B in another discharge hole C6, the distinguishing hole 20a in the stacked rotor core 1B is formed of the blanked portion ES4₂ in the second row, and the distinguishing hole 20b in the stacked rotor core 1B is formed of the blanked portion ES4₃ in the second row. Subsequently, insertion of magnets and filling of resins, for example, are performed, and the stacked rotor cores 1A and 1B are formed, respectively.

In this manufacturing method also, the spatial shape of the distinguishing hole 20a and the spatial shape of the distinguishing hole 20b are different, and thus by which working tool each worked portion has been worked can be distinguished. Because the spatial shape of the distinguishing hole 20b of the stacked rotor core 1B is different from the spatial shapes of the other distinguishing holes, in which row blanked members W of the stacked rotor core 1A have been blanked can be distinguished, and in which row blanked members W of the stacked rotor core 1B have been blanked can be distinguished. If distinguishing of rows is not required, the spatial shapes of the distinguishing holes 20a of the stacked rotor cores 1A and 1B may be substantially the same, and the spatial shapes of the distinguishing holes 20b of the stacked rotor cores 1A and 1B may be substantially the same.

In some examples, when taking out two rows is performed, the stacked rotor core 1A may have one distinguishing hole, the stacked rotor core 1B may have one distinguishing hole, and the spatial shapes of these distinguishing holes may be different. In this case, one row in which the blanked members W of the stacked rotor core 1A have been blanked and the other row in which the blanked members W of the stacked rotor core 1B have been blanked can be distinguished.

In some examples, blanked members W may be blanked from the electrical steel sheet ES in each row of a plurality of (three or more) rows which are located at positions different from each other in the width direction. The blanking device 130 may stack the blanked members W in each row.

Examples explained in the present description may be applied to a stacked stator core (stacked core) forming a stator.

In some examples, a plurality of permanent magnets 12 may be inserted into one magnet insertion hole. In this case, the permanent magnets 12 may include a first set of magnets aligned adjacent to each other in the height direction of the stack 10, may include a second set of magnets aligned adjacent to each other along a long side or a short side of the magnet insertion hole when viewed from the central axis Ax (in plan view), or may include both the first set of magnets and the second set of magnets.

ADDITIONAL EXAMPLES

An example stacked core may comprise a stack formed by stacking a plurality of blanked members and including a first end surface and a second end surface; a first distinguishing hole formed in the stack and being open at the first end surface; and a second distinguishing hole formed in the stack and being open at the first end surface. The spatial shape of the first distinguishing hole is different from the spatial shape of the second distinguishing hole. In this configuration, because the shape of the stacked core is not rotationally symmetric about the central axis of the stack, the position of a worked portion with respect to the first distinguishing hole (second distinguishing hole) is uniquely determined. For example, the angle of each of the worked portions about the central axis when the angle of the first distinguishing hole with respect to the central axis is defined as 0° is uniquely determined. Thus, correspondence relation between each worked portion included in a blanked member and the corresponding working tool can be figured out. By which working tool the worked portion has been worked can be distinguished.

In some examples, both the first distinguishing hole and the second distinguishing hole may penetrate a blanked member forming the first end surface among the plurality of blanked members. In this case, the first distinguishing hole and the second distinguishing hole can be formed by forming through holes in at least the blanked member forming the first end surface among the blanked members, and thus the first distinguishing hole and the second distinguishing hole can be easily formed.

In some examples, the first distinguishing hole may be different from the second distinguishing hole in at least one of depth, size at the first end surface, and shape at the first end surface. In this case, the spatial shape of the first distinguishing hole and the spatial shape of the second distinguishing hole are different, and thus by which working tool each worked portion has been worked can be distinguished.

In some examples, the first distinguishing hole and the second distinguishing hole may be arranged with a central axis of the stack interposed therebetween. In this case, because the first distinguishing hole and the second distinguishing hole are aligned in a straight line, the weight of an area removed from the stack due to the presence of the first distinguishing hole and the weight of an area removed from the stack due to the presence of the second distinguishing hole can be balanced. Thus, lack of weight balance (weight imbalance) is less likely to occur in the stacked core. Consequently, abnormal vibrations, noises, and the like during rotation of the stacked core can be reduced.

In some examples, the volume of the first distinguishing hole may be substantially the same as the volume of the second distinguishing hole. In this case, weight imbalance of the stacked core is still less likely to occur. Consequently, abnormal vibrations, noises, and the like during rotation of the stacked core can be further reduced.

An example method of manufacturing a stacked core may include: forming at least one first blanked member including a first hole portion and a second hole portion; forming at least one second blanked member without the first hole portion and the second hole portion; and stacking the at least one first blanked member and the at least one second blanked member to form a stack including a first distinguishing hole formed of the first hole portion and a second distinguishing hole formed of the second hole portion on one end surface of the stack, the spatial shape of the second distinguishing hole being different from the spatial shape of the first distinguishing hole. In this manufacturing method also, because the spatial shape of the first distinguishing hole and the spatial shape of the second distinguishing hole are different, by which working tool each worked portion has been worked can be distinguished.

An example method of manufacturing a stacked core may include: forming a first hole portion and a second hole portion in a first row on a metal sheet; forming a third hole portion and a fourth hole portion in a second row on the metal sheet, the second row being located at different position in a width direction of the metal sheet; blanking the metal sheet in the first row to form at least one first blanked member including the first hole portion and the second hole portion; blanking the metal sheet in the first row to form at least one second blanked member without the first hole portion and the second hole portion; blanking the metal sheet in the second row to form at least one third blanked member including the third hole portion and the fourth hole portion; blanking the metal sheet in the second row to form at least one fourth blanked member without the third hole portion and the fourth hole portion; stacking the at least one first blanked member and the at least one second blanked member to form a first stack including a first distinguishing hole formed of the first hole portion and a second distinguishing hole formed of the second hole portion on one end surface of the first stack, the spatial shape of the second distinguishing hole being different from the spatial shape of the first distinguishing hole; and stacking the at least one third blanked member and the at least one fourth blanked member to form a second stack including a third distinguishing hole formed of the third hole portion and a fourth distinguishing hole formed of the fourth hole portion on one end surface of the second stack, the spatial shape of the fourth distinguishing hole being different from the spatial shape of the first distinguishing hole, the spatial shape of the second distinguishing hole, and the spatial shape of the third distinguishing hole. In this manufacturing method also, because the spatial shape of the first distinguishing hole and the spatial shape of the second distinguishing hole are different, by which working tool each worked portion has been worked can be distinguished. Furthermore, because the spatial shape of the fourth distinguishing hole formed in the second stack is different from the spatial shapes of the other distinguishing holes, in which row blanked members forming the stack have been blanked can be distinguished.

An example method of manufacturing a stacked core may include: forming a first hole portion in a first row on a metal sheet; forming a second hole portion in a second row on the metal sheet, the second row being located at different position in a width direction of the metal sheet; blanking the metal sheet in the first row to form at least one first blanked member including the first hole portion; blanking the metal sheet in the first row to form at least one second blanked member without the first hole portion; blanking the metal sheet in the second row to form at least one third blanked member including the second hole portion; blanking the metal sheet in the second row to form at least one fourth blanked member without the second hole portion; stacking the at least one first blanked member and the at least one second blanked member to form a first stack including a first distinguishing hole formed of the first hole portion on one end surface of the first stack; and stacking the at least one third blanked member and the at least one fourth blanked member to form a second stack including a second distinguishing hole formed of the second hole portion on one end surface of the second stack, the spatial shape of the second distinguishing hole being different from the spatial shape of the first distinguishing hole. In this manufacturing method, because the spatial shape of the first distinguishing hole formed in the first stack is different from the spatial shape of the second distinguishing hole formed in the second stack, in which row blanked members forming the stack have been blanked can be distinguished.

We claim all modifications and variations coming within the spirit and scope of the subject matter claimed herein.

The invention claimed is:

1. A method of manufacturing a stacked core comprising:
    forming a first hole portion and a second hole portion in a first row on a metal sheet;
    forming a third hole portion and a fourth hole portion in a second row on the metal sheet, the second row being located at different position in a width direction of the metal sheet;
    blanking the metal sheet in the first row to form at least one first blanked member including the first hole portion and the second hole portion;
    blanking the metal sheet in the first row to form at least one second blanked member without the first hole portion and the second hole portion;
    blanking the metal sheet in the second row to form at least one third blanked member including the third hole portion and the fourth hole portion;
    blanking the metal sheet in the second row to form at least one fourth blanked member without the third hole portion and the fourth hole portion;
    stacking the at least one first blanked member and the at least one second blanked member to form a first stack including a first distinguishing hole formed of the first hole portion and a second distinguishing hole formed of the second hole portion on one end surface of the first stack, the spatial shape of the second distinguishing hole being different from the spatial shape of the first distinguishing hole; and stacking the at least one third blanked member and the at least one fourth blanked member to form a second stack including a third distinguishing hole formed of the third hole portion and a fourth distinguishing hole formed of the fourth hole portion on one end surface of the second stack, wherein the spatial shape of the fourth distinguishing hole is different from the spatial shape of the first distinguishing hole, the spatial shape of the second distinguishing hole, and the spatial shape of the third distinguishing hole.

2. A method of manufacturing a stacked core comprising:

forming at least one first blanked member including a first hole portion and a second hole portion;

forming at least one second blanked member without the first hole portion and the second hole portion; and stacking the at least one first blanked member and the at least one second blanked member to form a stack including a first distinguishing hole formed of the first hole portion and a second distinguishing hole formed of the second hole portion on one end surface of the stack, the spatial shape of the second distinguishing hole being different from the spatial shape of the first distinguishing hole, wherein the first distinguishing hole and the second distinguishing hole are arranged with a central axis of the stack interposed therebetween, and wherein the volume of the first distinguishing hole is substantially the same as the volume of the second distinguishing hole.

3. A stacked core comprising:

a stack formed by stacking a plurality of blanked members and including a first end surface and a second end surface;

a first distinguishing hole formed in the stack and being open at the first end surface; and a second distinguishing hole formed in the stack and being open at the first end surface, wherein the spatial shape of the first distinguishing hole is different from the spatial shape of the second distinguishing hole, wherein the first distinguishing hole and the second distinguishing hole are arranged with a central axis of the stack interposed therebetween, and wherein the volume of the first distinguishing hole is substantially the same as the volume of the second distinguishing hole.

4. The stacked core according to claim 3, wherein both the first distinguishing hole and the second distinguishing hole penetrate a blanked member forming the first end surface among the plurality of blanked members.

5. The stacked core according to claim 3, wherein the first distinguishing hole is different from the second distinguishing hole in at least one of depth, size at the first end surface, and shape at the first end surface.

6. The stacked core according to claim 3, wherein the first distinguishing hole is not open at the second end surface, wherein the second distinguishing hole is not open at the second end surface.

* * * * *